Oct. 28, 1930.  N. C. STEWART, JR  1,780,046
HEADLIGHT FOR VEHICLES
Filed June 15, 1929
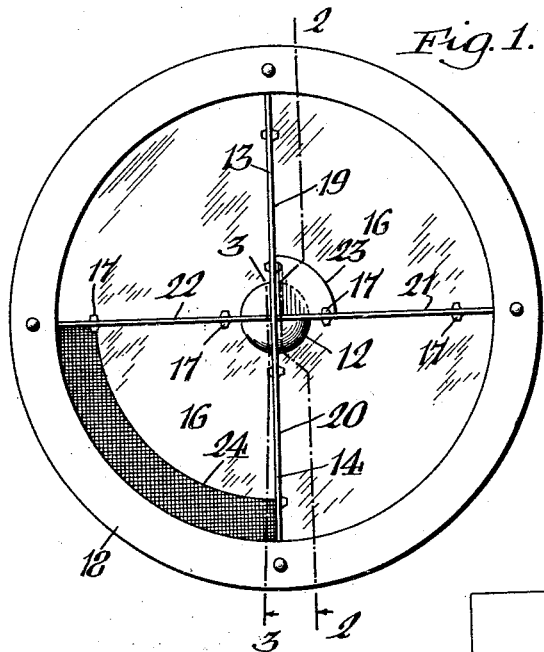
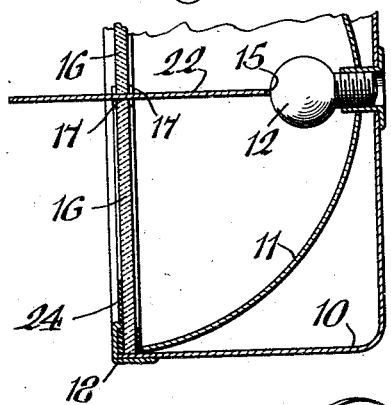
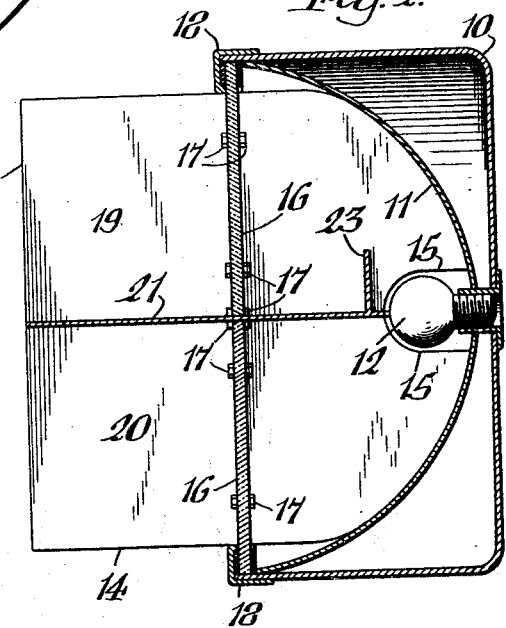
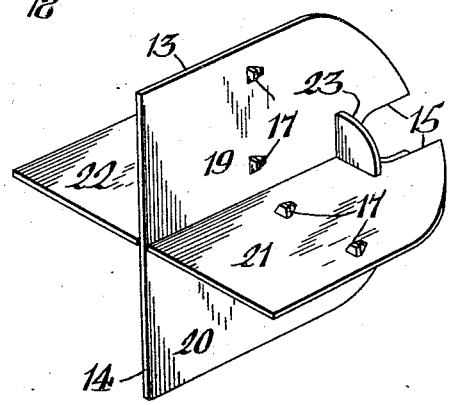
Inventor,
Newell Coe Stewart, Jr.,
by Walter P. Geyer
Attorney.

Patented Oct. 28, 1930

1,780,046

UNITED STATES PATENT OFFICE

NEWELL COE STEWART, JR., OF BUFFALO, NEW YORK

HEADLIGHT FOR VEHICLES

Application filed June 15, 1929. Serial No. 371,210.

This invention relates to improvements in headlights and particularly to those used on motor vehicles.

Its chief object is the provision of a headlight which is so designed and constructed as to effectually cut off or deflect the direct and reflected glaring rays and prevent them from shining into the eyes of approaching motorists and pedestrians.

Another object of the invention is to provide a deflector or non-glaring attachment for headlights of this character which is simple, compact and inexpensive in construction, and which can be applied to ordinary headlights.

In the accompanying drawings:

Figure 1 is a front view of a headlight embodying my invention. Figure 2 is a vertical section thereof taken on line 2—2, Figure 1. Figure 3 is a fragmentary vertical section on line 3—3, Figure 1. Figure 4 is a detached perspective view of the deflecting partitions.

Similar characters of reference indicate corresponding parts throughout the several views.

The body of the headlight may be of any appropriate and well known construction, that shown in the drawings, by way of example, consisting of a shell or casing 10, a parabolic reflector 11 and an electric lamp 12.

Disposed within the lamp-chamber formed by the reflector 11 and projecting forwardly therefrom are intersecting partitions or deflectors 13, 14 which are preferably disposed at substantially right angles to each other and which intersect along the center line of the lamp. The inner edges of the deflectors are shaped to the contour of the reflector 11 to fit snugly against it and they are cut away or notched as indicated at 15 to fit about the lamp 12. As seen in Figure 2, these intersecting deflectors project a suitable distance beyond the front side of the lamp-casing and may be exposed as shown, or protected from the weather in any appropriate manner. Fitted into the quadrant-like spaces formed by the deflectors are lenses 16 which may be held at their inner edges by lugs 17 struck up from the deflectors and at their outer edges by the customary holding rim 18 applied to the front side of the casing 10.

The deflecting partitions 13, 14 may be made of sheet metal or other suitable material and be constructed in the form of an attachment for existing lamps or made a permanent part of a new lamp. Said partitions form a plurality of light-emitting passages and the faces 19, 20, 21 and 22 thereof are preferably made dull or blackened so as not to reflect the direct or reflected rays of light issuing from the lamp into the eyes of approaching drivers, while the remaining faces of the deflectors may be polished to deflect the rays to advantage downwardly and to the right of the car out of the path of approaching vehicles.

Disposed in the lower corner of the upper right hand quadrant formed by the deflectors 13, 14 and at a point immediately in front of the lamp 12 is a light-intercepting shield 23 which is of the proper area to effectively block off the direct rays projected from the upper right hand portion of the lamp and prevent their shining into the eyes of approaching autoists or pedestrians. Likewise, to prevent the stray rays usually reflected from the lower left hand side of the parabolic reflector 11 directly into the eyes of approaching drivers, I provide a second light-intercepting or segmental shield 24 which is disposed diagonally opposite the shield 23 in the manner shown in Figure 1 and which may be produced by darkening or painting the outer arcuate portion of the corresponding lens 16. The area of the arcuate portion 24 is such that it does not interfere with the projection of those reflected rays which shine on to the roadway.

While manifestly simple and inexpensive in construction, this improved headlight, while affording ample road illumination in front of the car as well as to the right thereof, effectually eliminates glaring rays shining into the eyes of approaching drivers and pedestrians by deflecting not only the objectionable direct rays of the lamp but the dangerous stray or reflected rays as well.

I claim as my invention:—

1. The combination with a headlight having a reflector and a source of light, of intersecting deflectors disposed substantially in axial alinement with the source of light and projecting forwardly from said reflector, and means disposed immediately in front of the path of certain direct rays from the light source and between adjoining inner portions of said intersecting deflectors for intercepting said rays and preventing their shining into the eyes of approaching drivers.

2. The combination with a headlight having a reflector and a source of light, of intersecting deflectors disposed substantially in axial alinement with the source of light and projecting forwardly from said reflector, and means disposed in the path of certain rays reflected from said reflector for intercepting the same and preventing their shining into the eyes of approaching drivers, said means being arranged remote from the light source and between adjoining outer portions of said intersecting deflectors.

3. The combination with a headlight having a reflector and a source of light, of intersecting deflectors disposed substantially in axial alinement with the source of light and projecting forwardly from said reflector, means disposed immediately in front of a portion of the light source for intercepting certain of its direct rays, and means disposed forwardly of and diagonally opposite said first-named means for intercepting certain reflected rays.

4. The combination with a headlight having a reflector and a source of light, of intersecting deflectors disposed substantially in axial alinement with the source of light and projecting forwardly from said reflector to from quadrant-shaped light passages, and a light-intercepting shield disposed at the inner portion of one of said quadrant passages between adjoining deflectors and in front of the source of light.

5. The combination with a headlight having a reflector and a source of light, of intersecting deflectors disposed substantially in axial alinement with the source of light and projecting forwardly from said reflector to form quadrant-shaped light passages, a light-intercepting member disposed at the inner portion of one of said quadrant passages between adjoining deflectors and in front of the source of light, and a second light-intercepting member disposed in that quadrant passage diagonally opposite the one containing said first-named member, said second member being arranged at the outer portion of its quadrant passage adjacent the front edge of the reflector to intercept reflected rays.

6. An attachment for headlights, comprising a pair of intersecting deflectors forming quadrant-shaped light passages, and a light-intercepting shield disposed at the inner corner of one of said light passages and transversely of adjoining deflector-walls.

7. An attachment for headlights, comprising a pair of intersecting deflectors forming quadrant-shaped light passages, a light-intercepting shield disposed at the inner corner of one of said light passages and transversely of adjoining deflector-walls, and a second light-intercepting shield disposed in the diagonally opposite light passage and forwardly of the first-named shield, said second shield extending transversely between the divergent edges of the adjoining deflector-walls and spaced from the corner thereof.

NEWELL COE STEWART, Jr.